(12) United States Patent
Morioka et al.

(10) Patent No.: US 8,084,510 B2
(45) Date of Patent: Dec. 27, 2011

(54) EXPANDABLE POLYSTYRENIC RESIN PARTICLES AND PRODUCTION PROCESS THEREOF, PRE-EXPANDED PARTICLES AND MOLDED FOAM PRODUCT

(75) Inventors: Ikuo Morioka, Tokyo (JP); Yasutaka Tsutsui, Ritto (JP); Hideyasu Matsumura, Otsu (JP)

(73) Assignee: Sekisui Plastics Co., Ltd., Osaka (JP)

( * ) Notice: Subject to any disclaimer, the term of this patent is extended or adjusted under 35 U.S.C. 154(b) by 423 days.

(21) Appl. No.: 12/311,995

(22) PCT Filed: Oct. 25, 2007

(86) PCT No.: PCT/JP2007/071350
§ 371 (c)(1),
(2), (4) Date: Apr. 22, 2009

(87) PCT Pub. No.: WO2008/050909
PCT Pub. Date: May 2, 2008

(65) Prior Publication Data
US 2010/0022674 A1 Jan. 28, 2010

(30) Foreign Application Priority Data
Oct. 26, 2006 (JP) ................. 2006-291116

(51) Int. Cl.
*C08J 9/18* (2006.01)
*B29C 44/34* (2006.01)
(52) U.S. Cl. ............. 521/59; 264/53; 264/239; 521/139
(58) Field of Classification Search .................. 521/59, 521/139; 264/53, 239
See application file for complete search history.

(56) References Cited

U.S. PATENT DOCUMENTS

| | | | |
|---|---|---|---|
| 7,767,724 B2 * | 8/2010 | Matsumura et al. | 521/56 |
| 2006/0217452 A1 * | 9/2006 | Inada et al. | 521/142 |

FOREIGN PATENT DOCUMENTS

| | | |
|---|---|---|
| JP | 54-119563 | 9/1979 |
| JP | 2-284905 | 11/1990 |
| JP | 07-045590 | 2/1995 |
| WO | WO-2004/069917 A2 | 8/2004 |
| WO | WO-2005/021624 | 3/2005 |

OTHER PUBLICATIONS

Notification of Transmittal of the International Search Report and the Written Opinion of the International Searching Authority, or the Declaration; International Application No. PCT/JP2007/071350; International Filing Date: Oct. 25, 2007. (Forms: PCT/ISA/220 and PCT/ISA/210).

* cited by examiner

*Primary Examiner* — Timothy J. Kugel
(74) *Attorney, Agent, or Firm* — Rader, Fishman & Grauer PLLC

(57) ABSTRACT

Expandable polystyrenic resin particles having superior resistance to cracking of a molded foam product, having superior retention of blowing agent and maintaining expandability over a long period of time, a production process thereof, and a molded foam product are provided. These expandable polystyrenic resin particles contain a volatile blowing agent in polystyrenic resin particles obtained by impregnating and polymerizing a styrenic monomer in polyolefin resin particles to form a polystyrenic resin, wherein together with the styrenic monomer being used at 140 to 600 parts by weight to 100 parts by weight of the polyolefin resin particles, the average thickness of the surface layer observed in scanning electron micrographs obtained by immersing sections cut into halves through the center from the surface of the resin particles in tetrahydrofuran followed by extracting the polystyrenic resin component and capturing cross-sections of said sections is 15 to 150 µm, and the volatile blowing agent is contained at 5.5 to 13.0% by weight.

16 Claims, 4 Drawing Sheets

EXPANDABLE POLYSTYRENIC RESIN PARTICLES AND PRODUCTION PROCESS THEREOF, PRE-EXPANDED PARTICLES AND MOLDED FOAM PRODUCT

BACKGROUND OF THE INVENTION

1. Field of the Invention

The present invention relates to expandable polystyrenic resin particles (beads) and a production process thereof, pre-expanded particles and a molded foam product. More particularly, the expandable polystyrenic resin particles of the present invention employ a core-shell structure (see FIG. 1) having a surface layer (shell), and together with maintaining high expandability over a long period of time due to favorable retention of blowing agent, allow the obtaining of a molded foam product having superior resistance to cracking even if the blending ratio of polystyrenic resin is low.

Priority is claimed on Japanese Patent Application No. 2006-291116, filed on Oct. 26, 2006, the content of which is incorporated herein by reference.

2. Description of the Related Art

Impregnating polystyrene resin particles with a volatile blowing agent such as propane, butane or pentane allows the obtaining of expandable polystyrene resin particles (EPS) that have the ability to foam. Expandable polystyrene resin particles have favorable retention of blowing agent, can be stored at room temperature or in a refrigerated state, can be heated to form pre-expanded particles at appropriate times, and can be molded into molded foam products by filling into a mold of a molding machine and heating. Since this molded foam product has superior heat insulating properties, cushioning properties and light weight, it is used in a wide range of applications including food packages such as fish containers, cushioning materials for home appliances, and heat insulating materials for construction materials. However, these polystyrene resin molded foam products have the problem of being susceptible to cracking due to impacts and the like, thereby limiting further expansion of their applications.

On the other hand, molded foam products composed of polyolefin resins such as polyethylene resin or polypropylene resin are known to be flexible and resistant to cracking (superior cracking resistance) in addition to having the characteristics of polystyrenic resin molded foam products. However, since polyolefin resins have inferior blowing agent retention, they cannot be stored as expandable resin particles. Moreover, since foam molding conditions are required to be precisely controlled, they also have the problem of high production costs.

In order to solve the aforementioned problems, a molded foam product has been proposed that compounds a polystyrenic resin and polyolefin resin.

Patent Document 1 (Japanese Unexamined Patent Application, First Publication No. S54-119563) proposes secondary expandable foam particles in which the surface layer is composed of a foamed polyolefin resin while the core section is composed of foamed polystyrenic resin for the purpose of realizing the characteristics of both polystyrenic resin and polyolefin resin by mutually compensating for the shortcomings thereof.

In addition, Patent Document 1 describes that, according to these foam particles, moldability is superior since blowing agent is retained in the foamed polystyrenic resin of the core sections. Moreover, it is described that a molded foam product obtained from these foam resin particles has superior rigidity, flexibility and low-temperature properties.

However, as a result of the inventors of the present invention carrying out additional testing on the resin particles described in Patent Document 1, even if blowing agent was impregnated into the resin particles comprised of polystyrenic resin particles coated with polyolefin resin and immediately subjected to pre-expanding, only the internal polystyrenic resin underwent considerable foaming, while the polyolefin resin only exhibited slight foaming or no foaming at all. In addition, as a result thereof, separation occurred at the boundary between the surface polyolefin resin layer and the polystyrenic resin, thereby preventing the obtaining of the target molded foam product. In addition, due to prominent escape of blowing agent from the surface layer, it was difficult to store in the state of expandable resin particles. Thus, these foam particles have not been able to be used on an industrial scale.

In addition to the method described above, several expandable resin particles have been proposed in which polystyrenic resin is modified with polyolefin resin by impregnating a styrenic monomer into polyolefin resin particles and polymerizing an in aqueous medium.

For example, in Patent Document 2 (Japanese Examined Patent Application, Second Publication No. H7-45590), the inventors of the present invention proposed expandable styrene-modified polyethylene resin particles comprising impregnating a readily volatile blowing agent into styrene-modified polyethylene resin particles containing 0.01 to 5% by weight of water-containing silicon dioxide.

However, the properties of these modified expandable resin particles and molded foam products thereof are greatly affected by the ratio of the polystyrenic resin and polyethylene resin. Namely, although resistance to cracking of the molded foam products improves the higher the ratio of polystyrenic resin, since retention of blowing agent decreases rapidly, the period during which the expandable resin particles can be foam molded (to be referred to as bead life) is shortened, and it was difficult to realize both resistance to cracking and bead life.

In addition, Patent Document 3 (Japanese Unexamined Patent Application, First Publication No. 2006-70202) proposes styrene-modified polyethylene expandable resin particles containing 300 to 1000 parts by weight of a styrene resin component and a volatile blowing agent to 100 parts by weight of a polyethylene resin component containing an inorganic nucleating agent and having a melting point of 95 to 115° C., and in a state in which styrene resin particles of 0.8 µm or less are dispersed in a surface layer to at least 5 µm from the surface of the particles.

Although these modified expandable resin particles have improved bead life as a result of the styrene resin component being present in excess than the polyethylene resin component, the object of the present invention is unable to be achieved due to inadequate resistance to cracking.

In addition, the inventors of the present invention proposed foam particles of polystyrenic resin modified with polyolefin resin and a production process thereof in Patent Document 4 (International Publication No. WO 2005/021624).

The base resin particles of these foam particles were produced by adjusting the impregnation polymerization conditions of the styrenic monomer, namely adjusting the required stirring force to within a predetermined range, and adjusting the content of styrenic monomer in the polyolefin resin particles to a predetermined amount. Since polymerization progresses in the state in which the amount of styrenic monomer gradually decreases from the core sections towards the surface of the polyolefin resin particles, and further progresses while styrenic monomer is sequentially absorbed into polystyrenic resin formed in the polyolefin resin particles, the polyolefin resin particles become richer in polystyrenic resin the closer to the core sections accompanying formation of polystyrenic resin, while the surface is in a state in which polyolefin resin is present at a higher ratio.

In these foam particles, although polystyrenic resin is contained at a high ratio in the core sections thereof, at locations near the surface, polyolefin resin is contained at a high ratio while the ratio of polystyrenic resin gradually decreases moving towards the surface of the particles, thereby resulting in a state of being finely dispersed within the polyolefin resin, while the particle surface is in a state in which there is hardly any polystyrenic resin present.

Since a resulting molded foam product has a structure in which the entire surface thereof is covered with polyolefin resin containing a high ratio of pre-expanded particles near the surface thereof, the molded foam product is provided with superior resistance to cracking as well as chemical resistance.

However, since there is no change in the tendency for retention of blowing agent to decrease easily even if this technology is applied, it is difficult to maintain the bead life of the expandable resin particles for a long period of time, and it is still difficult to easily realize both resistance to cracking and bead life.

In addition, Patent Document 5 (Japanese Unexamined Patent Application, First Publication No. H2-284905) discloses a method that uses a water-soluble polymerization inhibitor in the production of carbon-containing styrene-modified expandable polyolefin resin particles by supplying styrenic monomer to an aqueous medium in which olefin resin particles containing electrically conductive carbon particles are dispersed in water, suspension polymerizing the styrenic monomer, and impregnating a volatile expansion agent into the particles.

The water-soluble polymerization inhibitor inhibits polymerization of vinyl monomers containing styrene near the surface of particles while dissolving in an aqueous medium and being absorbed by carbon-containing olefin resin particles. As a result, since the surfaces of the resulting styrene-modified expandable polyolefin resin particles have a lower amount of polystyrene than the particle centers, while conversely the surfaces having a higher content of electrically conductive carbon, styrene-modified olefin resin particles are obtained that have superior electrical conductivity.

As has been described above, a water-soluble polymerization inhibitor has the effect of inhibiting polymerization of styrenic monomer on the surface of polyolefin resin particles, and in that sense, makes it possible to improve the blackness and electrical conductivity of a molded foam product. However, since inhibition of styrenic monomer polymerization is limited to only the surface, effects for improving resistance to cracking are inadequate. Accordingly, since the ratio of polyolefin resin in modified resin particles cannot be lowered, retention of blowing agent is not enhanced and similarly the object of the present invention is unable to be achieved.

[Patent Document 1] Japanese Unexamined Patent Application, First Publication No. S54-119563
[Patent Document 2] Japanese Examined Patent Application, Second Publication No. H7-45590
[Patent Document 3] Japanese Unexamined Patent Application, First Publication No. 2006-70202
[Patent Document 4] International Publication No. WO
[Patent Document 5] Japanese Unexamined Patent Application, First Publication No. H2-284905

With the foregoing in view, an object of the present invention is to provide expandable polystyrenic resin particles, which together with having superior resistance to cracking for molded foam products, that was a problem for expandable polystyrenic resin particles of the prior art, maintains high expandability over a long period of time, a production process thereof, and a molded foam product.

SUMMARY OF THE INVENTION

During the course of this research, the inventors of the present invention found that bead life can be extended since molded foam products of expandable polystyrenic resin particles having a surface layer (shell) consisting mainly of a polyolefin resin demonstrate superior resistance to cracking, and the polyolefin resin component in a modified resin can be incorporated in a smaller amount. Moreover, it was also found that said expandable resin particles can be produced by containing a specific amount of a radical scavenger in polyolefin resin particles simultaneous to impregnating and polymerizing a specific amount or less of styrenic monomer. The present invention was completed on the basis of these findings.

The present invention provides expandable polystyrenic resin particles containing a volatile blowing agent in polystyrenic resin particles obtained by forming a polystyrenic resin in polyolefin resin particles by impregnating and polymerizing a styrenic monomer; wherein, 140 to 600 parts by weight of the styrenic monomer are impregnated and polymerized to 100 parts by weight of the polyolefin resin particles, the average thickness of the surface layer observed in scanning electron micrographs obtained by immersing sections cut into halves through the center from the surface of the resin particles in tetrahydrofuran followed by extracting the polystyrenic resin component and capturing cross-sections of said sections is 15 to 150 μm, and the volatile blowing agent is contained at 5.5 to 13.0% by weight.

In addition, the present invention provides a process for producing expandable polystyrenic resin particles comprising the steps of: 1) melt-extruding a polyolefin resin followed by granulating to obtain polyolefin resin particles, and 2) dispersing the polyolefin resin particles in an aqueous medium, impregnating the polyolefin resin particles with a styrenic monomer while polymerizing in the presence of an oil-soluble radical polymerization initiator, and impregnating with a volatile blowing agent either during or following completion of polymerization; wherein, the melt-extrusion of the polyolefin resin of step 1) is carried out in the presence of 0.005 to 0.5 parts by weight of a radical scavenger to 100 parts by weight of polyolefin resin, and the polymerization of step 2) uses 140 to 600 parts by weight of styrenic monomer, in which the content of phenylacetylene is 150 ppm or less, to 100 parts by weight of polyolefin resin particles.

In addition, the present invention provides pre-expanded particles having a bulk density of 0.015 to 0.25 g/cm$^3$ obtained by forming the aforementioned expandable polystyrenic resin particles as claimed in the present invention.

In addition, the present invention provides a molded foam product obtained by molding the aforementioned pre-expanded particles as claimed in the present invention in a mold.

In addition, the present invention provides a process for producing pre-expanded particles comprising the steps of: 1) melt-extruding a polyolefin resin followed by granulation to obtain polyolefin resin particles, wherein melt-extrusion of the polyolefin resin is carried out in the presence of 0.005 to 0.5 parts by weight of a radical scavenger to 100 parts by weight of polyolefin resin;

2) dispersing the polyolefin resin particles in an aqueous medium, impregnating the polyolefin resin particles with styrenic monomer while polymerizing in the presence of an oil-soluble radical polymerization initiator, and impregnating a volatile blowing agent either during or following completion of polymerization to obtain expandable polystyrenic resin particles, wherein the polymerization uses 140 to 600 parts by weight of styrenic monomer having a phenylacetylene content of 150 ppm or less to 100 parts by weight of polyolefin resin particles; and 3) pre-expanding the resulting expandable polystyrenic resin particles.

In addition, the present invention provides a process for producing a molded foam product comprising the steps of: 1) melt-extruding a polyolefin resin followed by granulation to obtain polyolefin resin particles, wherein melt-extrusion of the polyolefin resin is carried out in the presence of 0.005 to 0.5 parts by weight of a radical scavenger to 100 parts by weight of polyolefin resin; 2) dispersing the polyolefin resin particles in an aqueous medium, impregnating the polyolefin resin particles with styrenic monomer while polymerizing in the presence of an oil-soluble radical polymerization initiator, and impregnating a volatile blowing agent either during or following completion of polymerization to obtain expandable polystyrenic resin particles, wherein the polymerization uses 140 to 600 parts by weight of styrenic monomer having a phenylacetylene content of 150 ppm or less to 100 parts by weight of polyolefin resin particles; 3) pre-expanding the resulting expandable polystyrenic resin particles to obtain pre-expanded particles; and 4) molding the resulting pre-expanded particles in a mold.

Expandable polystyrenic resin particles of the present invention have improved bead life, which was a problem with expandable polystyrenic resin particles of the prior art, and are able to provide molded foam products having superior resistance to cracking.

DETAILED DESCRIPTION OF THE INVENTION

Figure 1:
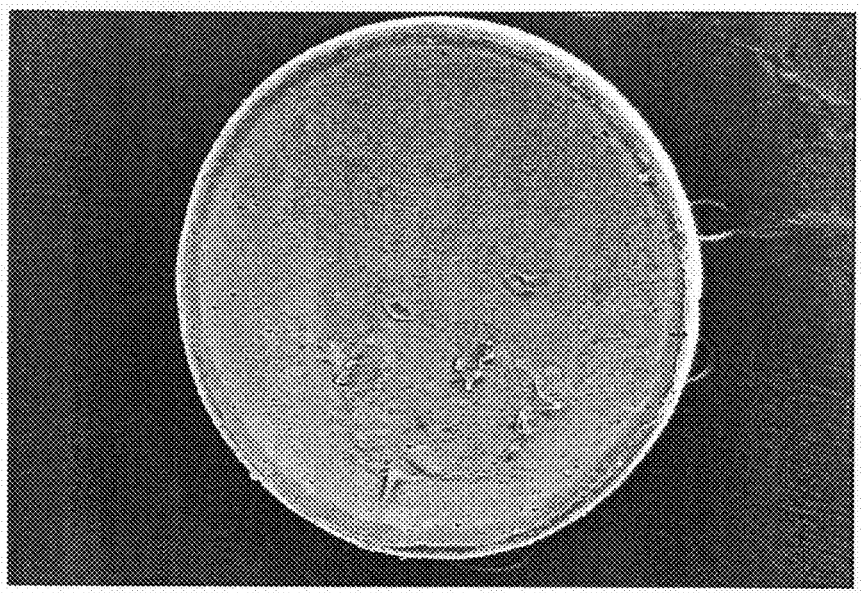
FIG. 1 is an example of a scanning electron micrograph (magnification: 50×) of the entire cross-section of a expandable polystyrenic resin particle of the present invention.

According to the present invention, expandable polystyrenic resin particles are provided containing a blowing agent in polystyrenic resin particles obtained by forming a polystyrenic resin in polyolefin resin particles by impregnating and polymerizing styrenic monomer; wherein, 140 to 600 parts by weight of the styrenic monomer are impregnated and polymerized to 100 parts by weight of the polyolefin resin particles, the average thickness of the surface layer observed in scanning electron micrographs (SEM) obtained by immersing sections cut into halves through the center from the surface of the resin particles in tetrahydrofuran (THF) followed by extracting the polystyrenic resin component and capturing cross-sections of said sections is 15 to 150 μn, and the volatile blowing agent is contained at 5.5 to 13.0% by weight.

The expandable polystyrenic resin particles of the present invention are particles containing a blowing agent in polystyrenic resin particles obtained by forming polystyrenic resin in polyolefin resin particles by impregnating and polymerizing a styrenic monomer, and refer to a resin in which polystyrenic resin has been modified with polyolefin resin. In addition, expandable polystyrenic resin particles are simply referred to as expandable resin particles in the following descriptions.

There are no particular limitations on the polyolefin resin used in the expandable polystyrenic resin particles of the present invention, and resin obtained by known polymerization methods can be used. In addition, the polyolefin resin may be crosslinked, examples of which include polyethylene resins such as branched, low-density polyethylene, linear, low-density polyethylene, intermediate-density polyethylene, high-density polyethylene, ethylene-vinyl acetate copolymer, ethylene-methyl methacrylate copolymer and crosslinked copolymers thereof, and polypropylene resins such as propylene-1-butene copolymer and ethylene-propylene-butene random copolymer. These low-density polyethylenes preferably have a density of 0.90 to 0.94 g/cm$^3$, more preferably a density of 0.91 to 0.94 g/cm$^3$, and most preferably a density of 0.91 to 0.93 g/cm$^3$.

In the present invention, the aforementioned polyolefin resin is a branched, low-density polyethylene, linear low-density polyethylene or ethylene-vinyl acetate copolymer, and the polystyrenic resin is more preferably polystyrene, styrene-alkyl acrylate copolymer or styrene-alkyl methacrylate copolymer, and the styrenic monomer is more preferable styrene, comonomer of styrene and an alkyl acrylate having styrene has a main component thereof, or comonomer of styrene and alkyl methacrylate having styrene has a main component thereof.

The polystyrenic resin used in the expandable polystyrenic resin particles of the present invention is a polystyrene, a copolymer of styrene and another polymerizable monomer having polystyrene or styrene as a main component thereof. Examples of other monomers include α-methylstyrene, p-methylstyrene, acrylonitrile, methacrylonitrile, acrylic acid, methacrylic acid, alkyl acrylate, alkyl methacrylate, divinyl benzene and polyethylene glycol dimethacrylate. These other monomers may be used within a range that does not substantially exceed 30% by weight of the polystyrenic resin.

In the present invention, the polystyrenic resin is formed from styrenic monomer within a range of 140 to 600 parts by weight to 100 parts by weight of the polyolefin resin particles. The blended amount of styrenic monomer is preferably 150 to 450 parts by weight.

If the blended amount of styrenic monomer exceeds 600 parts by weight, the resistance to cracking of a molded foam product obtained by molding pre-expanded particles in a mold decreases. On the other hand, if the blended amount is less than 140 parts by weight, although resistance to cracking improves considerably, the escape of blowing agent from the surface of the expandable resin particles tends to be accelerated, thereby lowering retention of blowing agent and in turn shortening the bead life of the expandable polystyrenic resin particles.

Moreover, the expandable polystyrenic resin particles of the present invention (to be referred to as expandable resin particles) are observed to have an average thickness of the surface layer of 15 to 150 μm in scanning electron micrographs (SEM) obtained by immersing sections cut into halves through the center from the surface of the resin particles in tetrahydrofuran (THF) followed by extracting the polystyrenic resin component and capturing cross-sections of said sections.

The following provides a more detailed explanation of the measurement method described above. First, 50 ml of tetrahydrofuran (THF) are placed in a 100 ml Erlenmeyer flask and allowed to stand for 2 hours or more at room temperature (20 to 23° C.).

Next, the expandable resin particles are cut in half through the center from the surface thereof using a cutter. One of the halved sections is placed in the Erlenmeyer flask and immersed in the THF for 4 hours. Next, the section and THF is filtered through an 80 mesh metal sieve, and the section remaining on the sieve is allowed to stand as is for 4 hours or more at room temperature to allow the THF therein to air dry. Subsequently, the section is removed from the sieve and an image of a cross-section of the section is captured with a scanning electron microscope (SEM) (magnification: 500 to 1000×) to measure the thickness of the surface layer. The average value is calculated using five sections and that value is taken to be the average thickness (μm).

If the average thickness of the surface layer is less than 15 μm, it is necessary to increase the ratio of polyolefin resin in order to obtain the target resistance to cracking, and as a result, retention of blowing agent decreases resulting in shorter bead life. In addition, if the average thickness exceeds 150 μm, although resistance to cracking increases considerably, a large amount of blowing agent tends to escape from the surface of the expandable resin particles, which ends up shortening bead life. In addition, as a result of significant escape of blowing agent from the surface of foam particles, fusion among particles during molding within the mold becomes poor, which tends to decrease resistance to cracking, while also tending to worsen the finished state of the appearance of molded foam products due to shrinkage and the like. The average thickness of the surface layer is preferably 20 to 100 μm.

Figure 2:
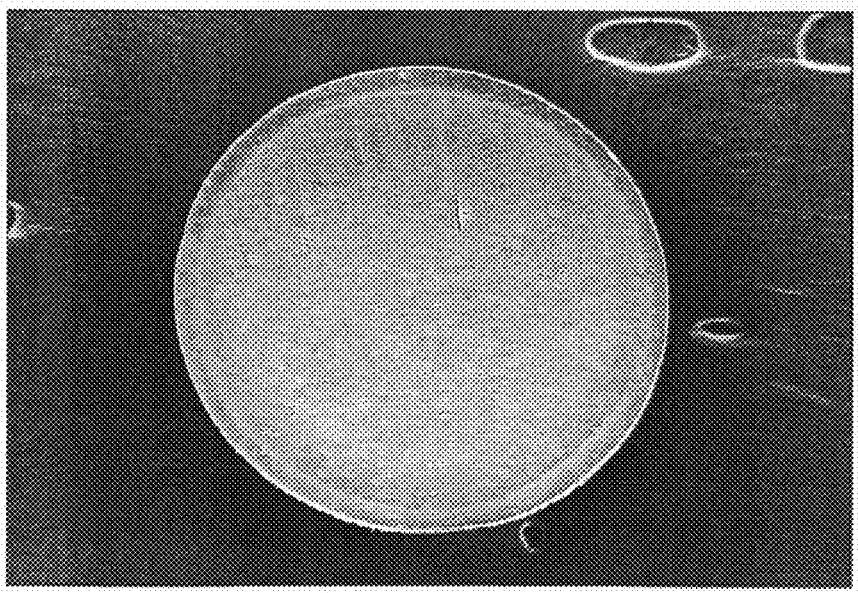
FIG. 2 is a scanning electron micrograph (magnification: 50×) of the entire cross-section of a expandable polystyrenic resin particle produced in Example 5 of the present invention.

Although the expandable resin particles of the present invention resemble base resin particles of the foam particles described in the aforementioned Patent Document 4, they are substantially different in terms of their resin structure. The base resin particles of the foam particles described in Patent Document 4 contain a high content of polystyrenic resin in the core sections thereof. On the other hand, the proportion of polystyrenic resin gradually decreases moving closer to the particle surface so that in the vicinity of the surface, the structure contains a high ratio of polyolefin resin (gradient structure). In contrast, in the expandable resin particles of the present invention, a structure is employed in which the surface layer, which has a higher ratio of polyolefin resin than the core, is clearly distinguished from the particle body (core-shell structure) (see FIGS. 1 and 2).

Due to this unique structure, physical strength, including resistance to cracking, of the resulting molded foam product is further improved. As a result, the bead life of the expandable resin particles can be extended since the ratio of polyolefin resin having inferior blowing agent retention can be reduced.

Figure 3:
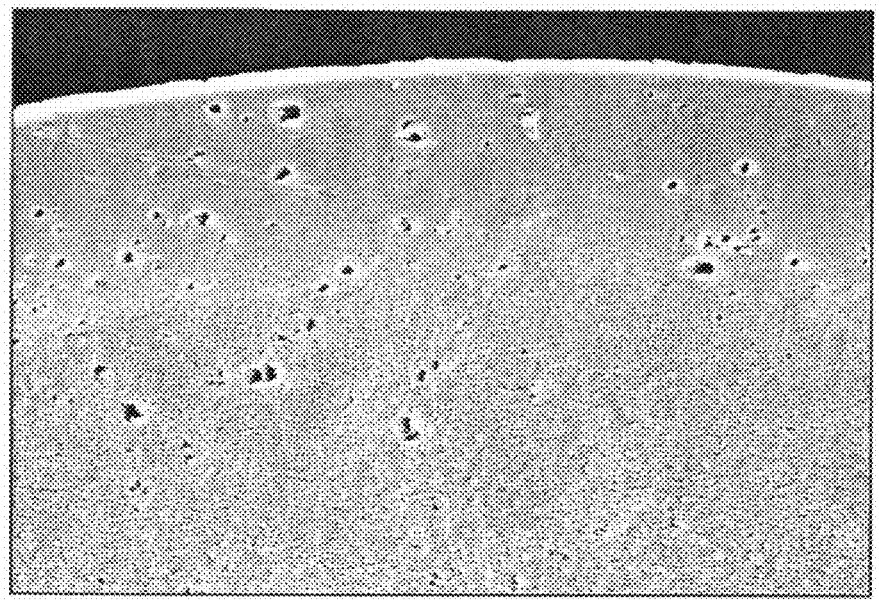
FIG. 3 is a scanning electron micrograph (magnification: 500×) of the surface layer in a cross-section of a expandable polystyrenic resin particle produced in Example 5 of the present invention.

Although the surface layer (shell) and interior other than the surface layer (core) of the expandable resin particles of the present invention are both composed of polyolefin resin and polystyrenic resin, the ratio of the composite resins can be clearly understood to vary largely at the boundary between the surface layer and interior in the aforementioned scanning electron micrographs (see FIG. 3).

Figure 4:
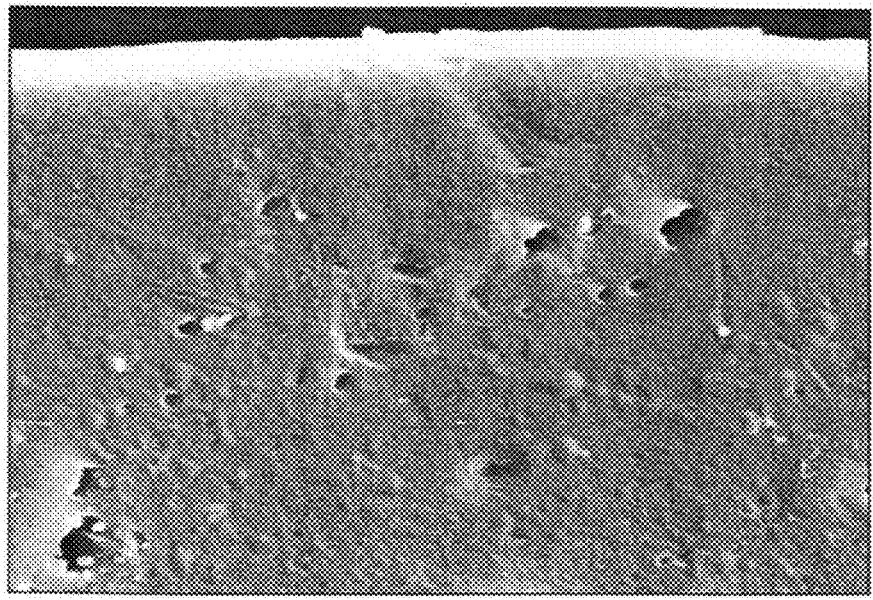
FIG. 4 is a scanning electron micrograph (magnification: 2000×) of the surface layer in a cross-section of a expandable polystyrenic resin particle produced in Example 5 of the present invention.
Figure 5:
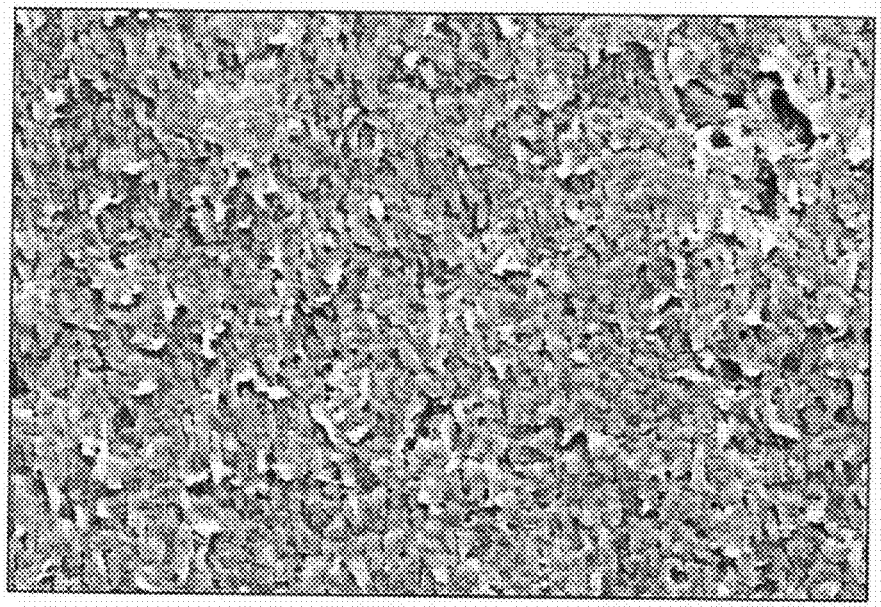
FIG. 5 is a scanning electron micrograph (magnification: 2000×) of the vicinity of the core in a cross-section of a expandable polystyrenic resin particle produced in Example 5 of the present invention.

In other words, in contrast to the interior having a finely dispersed structure in which polyolefin resin and polystyrenic resin are separated in phases (see FIG. 5), the surface layer only consists of a small amount of polystyrenic resin having a diameter of 1 to 5 μm dispersed in particulate form, while a finely dispersed state is not observed (see FIG. 4).

Thus, although the main component of the surface layer is polyolefin resin, it does not consist entirely of 100% polyolefin resin, but rather since polystyrenic resin is dispersed therein, the surface also foams well, thereby demonstrating properties that are completely different from the expandable resin particles of Patent Document 1.

Figure 6:
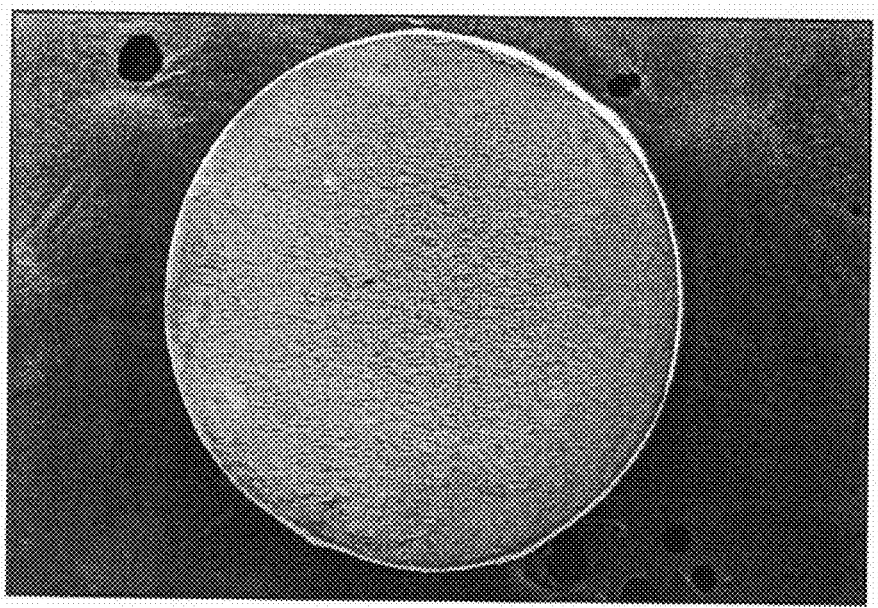
FIG. 6 is a scanning electron micrograph (magnification: 50×) of the entire cross-section of a expandable polystyrenic resin particle produced in Comparative Example 7 of the present invention.
Figure 7:
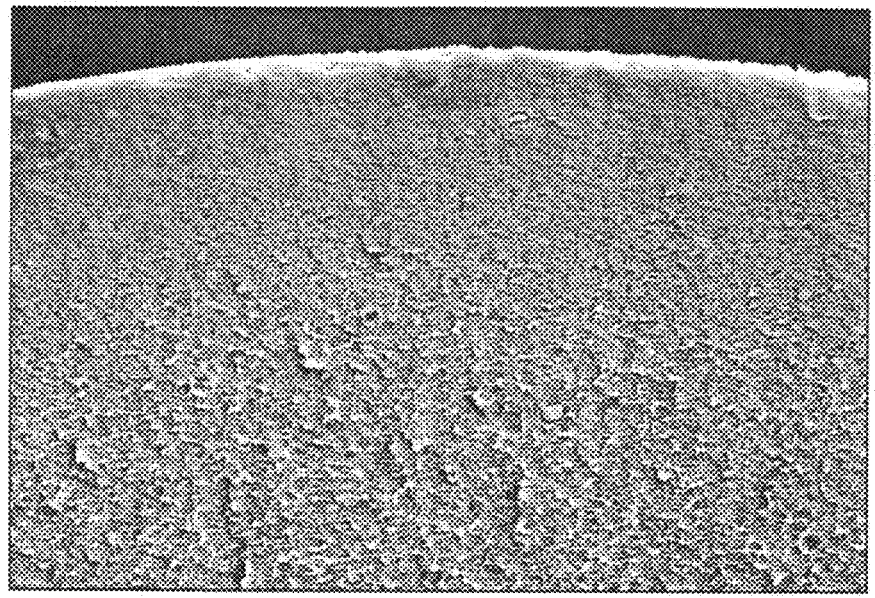
FIG. 7 is a scanning electron micrograph (magnification: 500×) of the surface layer in a cross-section of a expandable polystyrenic resin particle produced in Comparative Example 7 of the present invention.
Figure 8:
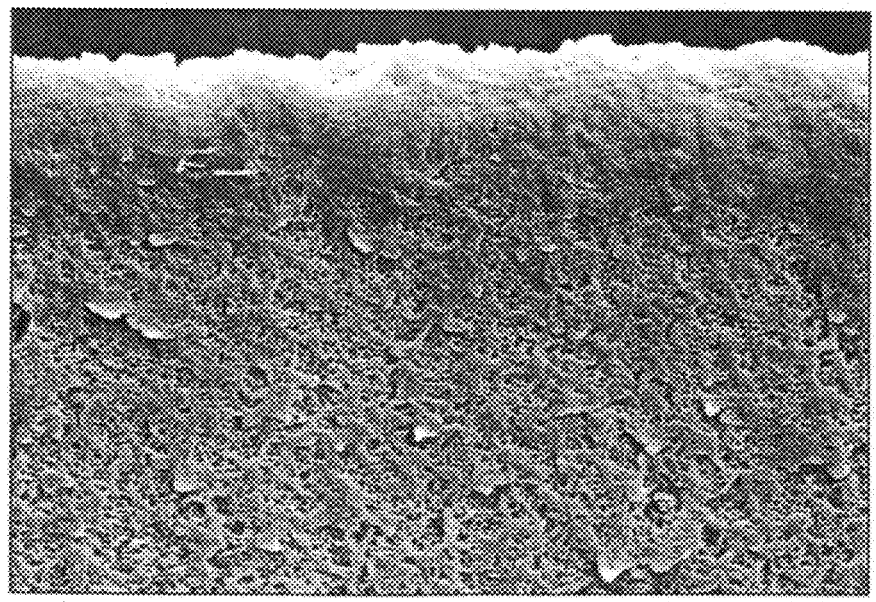
FIG. 8 is a scanning electron micrograph (magnification: 2000×) of the surface layer in a cross-section of a expandable polystyrenic resin particle produced in Comparative Example 7 of the present invention.

On the other hand, particles of the prior art have an ambiguous boundary between the surface layer and interior (see FIGS. 6 and 7), and the surface layer is in a state in which polystyrenic resin is finely dispersed in polyolefin resin (observed in the form of an infinite number of minute indentations measuring about 0.5 μm following THF treatment) (see FIG. 8).

The expandable resin particles of the present invention contain a volatile blowing agent. Examples of volatile blowing agents include propane, butane, pentane and dimethyl ether. The volatile blowing agent may be used alone or in combination. In addition, a small amount of cyclohexane, cyclopentane or hexane and the like may also be used in combination, with pentane (including n-pentane and iso-pentane either alone or as a mixture thereof) being particularly preferable. The content of these volatile blowing agents is 5.5 to 13.0% by weight based on the weight of the expandable resin particles. If the content of volatile blowing agent is less than 5.5% by weight, the expandability of the expandable resin particles decreases, which in addition to making it difficult to obtain pre-expanded particles having low bulk density and high expansion ratio, causes a decrease in the fusion rate of molded foam products obtained by molding these pre-expanded particles in a mold, thereby lowering resistance to cracking. On the other hand, if the content exceeds 13.0% by weight, although pre-expanded particles having a high expansion ratio are obtained at a bulk density of less than 0.015 g/cm$^3$, cell size easily becomes excessively large resulting in decreased moldability or a decrease in strength characteristics, such as compression and bending, of resulting molded foam products. The content of the volatile blowing agent is preferably within the range of 6.0 to 12.0% by weight.

The average particle diameter of the expandable resin particles of the present invention is 800 to 2400 μm. If the average particle diameter is less than 800 μm, the yield when obtaining polyolefin resin particles by melt-extruding polyolefin resin followed by granulation to be described later becomes extremely poor, which in addition to making increases in costs unavoidable, lowers the retention of blowing agent which tends to shorten bead life, thereby making this undesirable. If the average particle diameter exceeds 2400 µm, filling of the expandable resin particles into a mold when molding molded foam products having complex shapes tends to become poor. The average particle diameter is preferably 1200 to 2000 µm.

Next, an explanation is provided of a process for producing the expandable resin particles of the present invention that is particularly preferable for producing expandable resin particles as described above.

The production process of the present invention is a process for producing expandable resin particles comprising the steps of: 1) melt-extruding a polyolefin resin followed by granulating to obtain polyolefin resin particles, and 2) dispersing the polyolefin resin particles in an aqueous medium, impregnating the polyolefin resin particles with a styrenic monomer while polymerizing in the presence of an oil-soluble radical polymerization initiator, and impregnating with a volatile blowing agent either during or following completion of polymerization; wherein, the melt-extrusion of the polyolefin resin of step 1) is carried out in the presence of 0.005 to 0.5 parts by weight of a radical scavenger to 100 parts by weight of polyolefin resin, and the polymerization of step 2) uses 140 to 600 parts by weight of styrenic monomer, in which the content of phenylacetylene is 150 ppm or less, to 100 parts by weight of polyolefin resin particles.

In the production process of the present invention, after melt-extruding the polyolefin resin using an extruder, the extruded polyolefin resin is granulated in water by cutting or strand cutting to produce polyolefin resin particles in the form of tiny pellets (to also be referred to as micropellets). The polyolefin resin used is normally in pellet or granular form.

At this time, by either adding the radical scavenger to the polyolefin resin in advance or adding simultaneous to melt-extrusion, the radical scavenger can be uniformly contained in the micropellets. There are no particular limitations on the shape of the micropellets, and may in the form of, for example, a complete spherical, ovals (egg-shaped), cylinders or rectangular columns.

Next, the micropellets are dispersed in an aqueous medium in a polymerization vessel, and then impregnated with styrenic monomer while polymerizing in the presence of an oil-soluble radical polymerization initiator. The oil-soluble radical polymerization initiator is added to the aqueous medium alone or after dissolving or dispersing in the styrenic monomer or a solvent such as isoparaffin.

At this time, the oil-soluble radical polymerization initiator, which has a large molecular weight than the styrenic monomer, remains more easily on the surface of the micropellets, and polymerization of the styrenic monomer occurs more easily near the surface than in the interior of the micropellets.

For example, the molecular weight of dibenzoyl peroxide, which can be preferably used for the oil-soluble radical polymerization initiator, is 242, which is roughly twice that of styrene (molecular weight: 104).

However, if a radical scavenger is contained in the micropellets, polymerization of the styrenic monomer near the surface of the micropellets is inhibited, and as a result, polymerization preferentially occurs in the interior rather than near the surface.

The radical scavenger serving as a characteristic component of the present invention is a compound that has the action of capturing radicals, examples of which include polymerization inhibitors (including polymerization retarders), chain transfer agents, antioxidants and hindered amine-based photostabilizers, and those that are insoluble in water are preferable.

Examples of polymerization inhibitors include phenol-based polymerization inhibitors, nitroso-based polymerization inhibitors, aromatic amine-based polymerization inhibitors, phosphoric acid ester-based polymerization inhibitors and thioether-based polymerization inhibitors such as t-butylhydroquinone, para-methoxyphenol, 2,4-dinitrophenol, t-butylcatechol, sec-propylcatechol, N-methyl-N-nitrosoaniline, N-nitrosophenylhydroxylamine, triphenyl phosphite, tris(nonylphenylphosphite), triethyl phosphite, tris(2-ethylhexyl) phosphite, tridecyl phosphite, tris(tridecyl) phosphite, diphenylmono(2-ethylhexyl) phosphite, diphenylmonodecyl phosphite, diphenylmono(tridecyl) phosphite, dilauryl hydrogen phosphite, tetraphenyl dipropylene glycol diphosphite and tetraphenyl tetra(tridecyl) pentaerythritol tetraphosphate.

In addition, examples of chain transfer agents include β-mercaptopropionic acid 2-ethylhexyl ester, dipentaerythritol hexaquis(3-mercaptopropionate) and tris[(3-mercaptopropionyloxy)-ethyl] isocyanurate.

Examples of antioxidants include phenol-based antioxidants, phosphorous-based antioxidants and amine-based antioxidants such as 2,6-di-t-butyl-4-methylphenol (BHT), n-octadecyl-3-(3,5-di-t-butyl-4-hydroxyphenyl) dibenzoyl peroxide propionate, pentaerythrityl-tetraquis[3-(3,5-di-t-butyl-4-hydroxyphenyl)propionate], 1,3,5-tris(3,5-di-tert-butyl-4-hydroxybenzyl) isocyanurate, 1,3,5-trimethyl-2,4,6-tris(3,5-di-t-butyl-4-hydroxybenzyl)benzene, 3,9-bis[2-{3-(3-t-butyl-4-hydroxy-5-methylphenyl)propionyloxy}-1,1-dimethylethyl]-2,4,8,10-tetraoxaspiro[5.5]undecane, distearylpentaerythritol diphosphite, tris(2,4-di-t-butylphenyl) phosphite, bis(2,4-di-t-butylphenyl) pentaerythritol diphosphite, tetraquis(2,4-di-t-butylphenyl) 4,4'-biphenylene diphosphonite, bis(2-t-butyl-4-methylphenyl) pentaerythritol diphosphite, 2,4,8,10-tetra-t-butyl-6-[3-(3-methyl-4-hydroxy-5-t-butylphenyl)propoxy]dibenzo[d,f][1,3,2]dioxaphosphepine, phenyl-1-napthylamine, octylated diphenylamine, 4,4-bis(α,α-dimethylbenzyl) diphenylamine and N,N'-di-2-naphthyl-p-phenylenediamine.

Examples of hindered amine-based photostabilizers include bis(2,2,6,6-tetramethyl-4-pyridyl) sebacate, bis(1,2,2,6,6-pentamethyl-4-piperidyl) sebacate and bis(1,2,2,6,6)-pentamethyl-4-piperidyl)-2-(3,5-di-t-butyl-4-hydroxybenzyl)-2-n-butyl malonate.

Phenol-based antioxidants are particularly preferable among the aforementioned radical scavengers. This is because the presence of this antioxidant during melt-extrusion makes it possible to prevent thermal degradation of the polyolefin resin (including lowering of molecular weight, gelling, yellowing and formation of carbides) caused by high temperatures during melt-extrusion.

The aforementioned radical scavenger is uniformly present in the micropellets after a portion thereof has been consumed (by oxidation and the like) in the melt-extrusion process.

The amount of the aforementioned radical scavenger used is 0.005 to 0.5 parts by weight to 100 parts by weight of polyolefin resin. If the amount used is less than 0.005 parts by weight, since polymerization of styrenic monomer near the surface layer is not inhibited, the thickness of the surface layer, which is mainly composed of polyolefin resin, is less than 15 µm. On the other hand, if the amount used exceeds 0.5 parts by weight, since polymerization of styrenic monomer is also inhibited in the interior of the micropellets, polymerization time is delayed considerably, which not only lowers productivity, but also tends to cause a large amount of styrenic monomer to remain in the resin particles.

In addition to the aforementioned polyolefin resin, foam nucleating agents such as talc, calcium silicate, synthetic or naturally-produced silicon dioxide, ethylene bis-stearic acid amide or methacrylic acid ester copolymers, flame retardants such as hexabromocyclododecane or triallyl isocyanurate hexabromide, or colorants such as carbon black, iron oxide or graphite may also be contained.

Examples of the aqueous medium used in the production process of the present invention include water and a mixed medium of water and water-soluble solvent (such as alcohol). Polystyrenic resin particles are obtained by impregnating a styrenic monomer into polyolefin resin particles while polymerizing in the presence of an oil-soluble radical polymerization initiator in an aqueous medium in which the polyolefin resin particles are dispersed.

At this time, the styrenic monomer used is limited to styrenic monomer in which the content of phenylacetylene is 150 ppm or less. Expandable polystyrenic resin particles having a core-shell structure having the target surface layer (shell) of the present invention can be obtained by impregnating and polymerizing a specific styrenic monomer in micropellets uniformly containing the aforementioned radical scavenger, followed by adding a blowing agent.

A method in which benzene is reacted with ethylene to form ethylbenzene followed by dehydrogenating this ethylbenzene in an EB dehydrogenation apparatus to obtain styrene is primarily employed for the process for producing the styrene serving as the main component of the styrenic monomer of the present invention. In addition, a method is also occasionally employed by which styrene is obtained by dehydrating α-phenylethyl alcohol.

Although styrene obtained by the method involving dehydration of α-phenylethyl alcohol is substantially free of phenylacetylene, when using the method involving dehydrogenation of ethylbenzene, the ethylbenzene is excessively dehydrogenated in a single step, and phenylacetylene is produced as a by-product thereof. As a result, the product obtained from the dehydrogenation apparatus contains styrene, ethylbenzene and a trace amount of phenylacetylene. Although ethylbenzene can be easily reduced by methods such as distillation, since the boiling point of phenylacetylene is 141 to 142° C., which is extremely close to the boiling point of styrene at 145° C., it is difficult to separate the two by distillation.

The molecular weight of phenylacetylene is slightly less than that of styrene, and phenylacetylene is absorbed into the micropellets together with the styrene added to the aqueous medium. However, if phenylacetylene is present during free radical polymerization of styrenic monomer, it acts as a chain transfer agent thereby slowing the reaction rate of the styrenic monomer.

Thus, phenylacetylene ends up being present in the interior of the micropellets in addition to the radical scavenger, the conversion rate of styrenic monomer to polystyrenic resin decreases, and the styrenic monomer added to the aqueous medium gradually tends to become easily suspended in the aqueous medium. As a result, it becomes more difficult for polymerization to occur on the surface of the micropellets. This tendency becomes particularly conspicuous during the latter half of polymerization when the relative concentration of phenylacetylene increases.

The styrenic monomer used in the present invention yields better results the lower the content of phenylacetylene as described above. In this sense, the use of styrene that has been produced by the method involving dehydration of α-phenylethyl alcohol and is substantially free of phenylacetylene is particularly preferable. A known example of a method for industrially producing α-phenylethyl alcohol is the Halcon process.

Furthermore, examples of methods used to reduce the amount of phenylacetylene in methods for producing styrene by dehydrogenating ethylbenzene include: (1) treating styrene with an inorganic substance such as alumina, active alumina, silica gel or active charcoal, (2) contacting styrene with organic aluminum followed by treating with an inorganic substance as described above, and (3) contacting styrene with organic aluminum followed by distillation.

The amount of styrenic monomer used in the present invention is 140 to 600 parts by weight to 100 parts by weight of the polyolefin resin particles. If the amount of styrenic monomer used exceeds 600 parts by weight, particles are formed consisting only of polystyrenic resin without being impregnated in the polyolefin resin particles, thereby making this undesirable. In addition, molded foam products obtained by molding pre-expanded particles in a mold have decreased resistance to cracking as well as decreased chemical resistance, thereby also making this undesirable.

On the other hand, if the amount of styrenic monomer used is less than 140 parts by weight, there are cases in which the ability to retain blowing agent by the resulting expandable polystyrenic resin particles decreases, thereby preventing the obtaining of a high degree of foaming and making this undesirable.

Here, impregnation and polymerization of the styrenic monomer preferably are preferably allowed to proceed roughly simultaneously. In this case, impregnation and polymerization are preferably carried out while adjusting the rate of addition of styrenic monomer or adjusting the polymerization temperature so that the content of styrenic monomer in the polyolefin resin particles is maintained at 0 to 35% by weight. In the case of carrying out polymerization after having carried out impregnation, polymerization of styrenic monomer near the surface of the polyolefin resin particles occurs easily or styrenic monomer not impregnated in the polyolefin resin particles is polymerized alone, thereby potentially resulting in the formation of a large number of polystyrenic resin particles in the form of fine particles, thereby making this undesirable.

Polyolefin resin particles in the case of calculating the aforementioned content refer to particles composed of polyolefin resin, impregnated styrenic monomer and impregnated polystyrenic resin that has already been polymerized.

In order to maintain the aforementioned content at 0 to 35% by weight, the styrenic monomer is continuously or intermittently added to an aqueous medium in a polymerization vessel. Moreover, the styrenic monomer is preferably added gradually to the aqueous medium.

A polymerization initiator commonly used to polymerize styrenic monomers can be used for the oil-soluble radical polymerization initiator that polymerizes the styrenic monomer, examples of which include organic peroxides such as dibenzoyl peroxide, lauroyl peroxide, t-butylperoxy octoate, t-hexylperoxy octoate, t-butylperoxy benzoate, t-amylperoxy benzoate, t-butylperoxy pivalate, t-butylperoxy isopropyl carbonate, t-hexylperoxy isopropyl carbonate, t-butylperoxy-3,3,5-trimethyl cyclohexanoate, di-t-butylperoxy hexahydroterephthalate, 2,2-di-t-butylperoxy butane, di-t-hexyl peroxide or dicumyl peroxide, and azo compounds such as azobisisobutyronitrile or azobisdimethylvaleronitrile. Furthermore, these oil-soluble radical polymerization initiators may be used alone or in combination.

There are various methods for adding the aforementioned polymerization initiators to an aqueous medium in a polymerization vessel, examples of which include: (1) containing the polymerization initiator in a separate vessel from the polymerization vessel by dissolving in styrenic monomer followed by supplying this styrenic monomer to the polymerization vessel, (2) preparing a solution by dissolving the polymerization initiator in a portion of the styrenic monomer and a solution of isoparaffin and the like or a plasticizer, followed by simultaneously supplying this solution and a predetermined amount of styrenic monomer to the polymerization vessel, and (3) preparing a dispersion in which the polymerization initiator is dispersed in an aqueous medium, followed by supplying this dispersion and the styrenic monomer to the polymerization vessel.

The amount of radical polymerization initiator used is normally such that it is preferably added at 0.02 to 2.0% by weight of the total amount of styrenic monomer used.

In the production process of the present invention, a water-soluble radical polymerization inhibitor is preferably dissolved in an aqueous medium. This is because a water-soluble radical polymerization inhibitor not only inhibits polymerization of styrenic monomer on the outermost surface of the micropellets, but also prevents styrenic monomer suspended in the aqueous medium from polymerizing alone, thereby making it possible to reduce the formation of microparticles of polystyrenic resin.

Examples of water-soluble radical polymerization inhibitors include salts of thiocyanic acid such as ammonium thiocyanate, zinc thiocyanate, sodium thiocyanate, potassium thiocyanate or aluminum thiocyanate, salts of nitrous acid such as sodium nitrite, potassium nitrite, ammonium nitrite, calcium nitrite, silver nitrite, strontium nitrite, cesium nitrite, barium nitrite, magnesium nitrite, lithium nitrite or dicyclohexylammonium nitrite, water-soluble sulfur-containing organic compounds such as mercaptoethanol, monothiopropylene glycol, thioglycerol, thioglycolic acid, thiohydroacrylic acid, thiolactic acid, thiomalic acid, thioethanolamine, 1,2-dithioglycerol or 1,3-dithioglycerol, as well as ascorbic acid and sodium ascorbate. Among these, salts of nitrous acid are particularly preferable.

The amount of the aforementioned water-soluble radical polymerization inhibitor used is preferably 0.001 to 0.04 parts by weight to 100 parts by weight of water in the aqueous medium.

Furthermore, a dispersant is preferably added to the aforementioned aqueous medium. Examples of such dispersants include organic dispersants such as partially saponified polyvinyl alcohol, polyacrylic acid salts, polyvinyl pyrrolidone, carboxymethyl cellulose or methyl cellulose, and inorganic dispersants such as magnesium pyrophosphate, calcium pyrophosphate, calcium phosphate, calcium carbonate, magnesium phosphate, magnesium carbonate or magnesium hydroxide. Among these, inorganic dispersants are preferable.

In the case of using an inorganic dispersant, it is preferably used in combination with a surfactant. Examples of such surfactants include sodium dodecylbenzene sulfonate and sodium α-olefin sulfonate.

There are no particular limitations on the shape or structure of the polymerization vessel provided it is that conventionally used for suspension polymerization of styrenic monomers. In addition, there are no particular limitations on the shape of the stirrer, specific examples of which include paddle stirrers such as V-type paddle stirrers, Fahdler stirrers, pitched V-type paddle stirrers and pull margin stirrers, turbine stirrers such as turbine stirrers and fan turbine stirrers, and propeller stirrers such as marine propeller stirrers. Among these, paddle stirrers are preferable. Stirrers may be of the single-stage impeller type or multistage impeller type. The polymerization vessel may also be provided with a baffle.

In addition, although there are no particular limitations on the temperature of the aqueous medium when polymerizing the styrenic monomer in the micropellets, it is preferably within the range of −30 to +20° C. of the melting point of the polyolefin resin used. More specifically, the temperature is preferably 70 to 140° C. and more preferably 80 to 130° C. Moreover, the temperature of the aqueous medium may be a constant temperature from start to completion of styrenic monomer polymerization or may be increased incrementally. In the case of increasing the temperature of the aqueous medium, it is preferably increased at a rate of 0.1 to 2° C./minute.

Moreover, in the case of using particles composed of crosslinked polyolefin resin, crosslinking may be carried out in advance prior to impregnating with styrenic monomer, may be carried out during the time styrenic monomer is impregnated and polymerized in the micropellets, or may be carried out after having impregnated and polymerized the styrenic monomer in the micropellets.

Examples of crosslinking agents used for crosslinking polyolefin resin include organic peroxides such as 2,2-di-t-butylperoxy butane, dicumyl peroxide and 2,5-dimethyl-2,5-di-t-butylperoxy hexane. Furthermore, the crosslinking agent may be used alone or by combining two or more types. In addition, the amount of crosslinking agent normally used is preferably 0.05 to 1.0 parts by weight to 100 parts by weight of the polyolefin resin particles (micropellets).

Examples of methods for adding the crosslinking agent include a method in which the crosslinking agent is added directly to the polyolefin resin, a method in which the crosslinking agent is added after dissolving in a solvent, plasticizer or styrenic monomer, and a method in which the crosslinking agent is added after dispersing in water. Among these, the crosslinking agent is preferably added after dissolving in styrenic monomer.

A volatile blowing agent is impregnated during or following completion of impregnation and polymerization of the aforementioned styrenic monomer in order to obtain the expandable polystyrenic resin particles of the present invention (to be referred to as expandable resin particles). Examples of methods for impregnating with a volatile blowing agent include: 1) injecting the blowing agent into a polymerization vessel in which resin particles in which the styrenic monomer is still being polymerized, or resin particles in which polymerization of the styrenic monomer has been completed, are dispersed in an aqueous medium, and 2) supplying resin particles to a heatable rotating mixer (tumbler) and then injecting blowing agent into this rotating mixer.

Moreover, a foaming assistant may also be used with the volatile blowing agent. Examples of such foaming assistants include solvents such as toluene, xylene, ethylbenzene, cyclohexane or d-limonene, and plasticizers such as diisobutyl adipate, diacetylated monolaurate and palm oil. Furthermore, the amount of foaming assistant added is preferably 0.1 to 2.5 parts by weight to 100 parts by weight of resin particles in which polymerization has been completed.

In addition, surface treatment agents such as anti-bonding agents, fusion promoters or antistatic agents may be added when impregnating the resin particles with the volatile blowing agent.

Anti-bonding agents fulfill the roles of preventing cohesion of particles during frozen storage of expandable resin particles and preventing cohesion of foam particles when pre-expanding expandable resin particles, specific examples of which include talc, calcium carbonate, zinc stearate, aluminum hydroxide, ethylene bis-stearic acid amide, tricalcium phosphate and dimethyl polysiloxane.

Fusion promoters fulfill the role of promoting fusion of pre-expanded particles when molding the pre-expanded particles in a mold, specific examples of which include stearic acid, stearic acid triglyceride, hydroxystearic acid triglyceride and stearic acid sorbitan ester.

Examples of antistatic agents include polyoxyethylene alkyl phenol ether and stearic acid monoglyceride.

Furthermore, the total added amount of the aforementioned surface treatment agents is preferably 0.01 to 2.0 parts by weight to 100 parts by weight of polymerized resin particles.

In the aforementioned methods, the resin temperature during impregnation of resin particles with blowing agent is 40 to 100° C., and the impregnation time is 0.5 to 10 hours.

After having impregnated the resin particles with blowing agent, the expandable resin particles are removed from the aqueous medium or rotary mixer preferably after having cooled the resin temperature to 30° C. or lower.

Since the retention of blowing agent (bead life) of the removed expandable resin particles of the present invention is considerably improved, they can be stored for a long period of time either refrigerated at 10° C. or lower or frozen.

The following provides an explanation of a process for obtaining pre-expanded particles, and subsequently molded foam products, from the expandable resin particles.

Pre-expanded particles can be obtained as necessary by pre-expanding expandable resin particles impregnated with a blowing agent to a predetermined bulk density by heating using a heating medium such as water vapor.

Pre-expanded particles have a bulk density of 0.015 to 0.25 g/cm$^3$, and preferably having a bulk density of 0.018 to 0.20 g/cm$^3$. If the bulk density is less than 0.015 g/cm$^3$, the volume percentage of closed cells decreases causing a decrease in the strength of molded foam products obtained by foaming the pre-expanded particles, thereby making this undesirable. On the other hand, if the bulk density exceeds 0.25 g/cm$^3$, the mass of molded foam products obtained by foaming the pre-expanded particles increases, thereby making this undesirable.

Moreover, a molded foam product having a desired shape can be obtained by filling the pre-expanded particles into a mold of a molding machine and inducing secondary foaming by heating to cause the pre-expanded particles to melt and integrally adhere. Example of the aforementioned molding machine that can be used is an EPS molding machine used when producing molded foam products from polystyrenic resin pre-expanded particles.

As has been described above, the resulting molded foam products can be used in applications such as cushioning materials of home appliances and the like or transport packages for electronic components, various industrial materials and foods. In addition, they can also be suitably used as core materials for automobile bumpers and impact energy-absorbing materials for door interior cushioning materials and the like.

Although the following provides a detailed explanation of the present invention through examples thereof, the present invention is not limited thereto. Furthermore, the maximum styrenic monomer content in the polyolefin resin particles during polymerization, the mean particle diameter of the expandable resin particles, the content of blowing agent, the bulk density of pre-expanded particles and the fusion rate and resistance to cracking of molded foam products as measured in the following examples are indicated below.

(Maximum Styrenic Monomer Content)

A portion of polyolefin resin particles undergoing polymerization following impregnation with styrenic monomer were removed from the polymerization vessel and separated from the aqueous medium followed by removing moisture from the surface of the polyolefin resin particles with gauze for use as a measurement sample.

0.08 g of the measurement sample were accurately weighed and immersed in 40 ml of toluene for 24 hours to extract the styrenic monomer. 10 ml of Wijs reagent, 30 ml of 5 wt % aqueous potassium iodide solution and about 30 ml of 1 wt % aqueous starch solution were placed in a solution of the extracted styrenic monomer followed by titrating with N/40 sodium thiosulfate solution and determination of the titration volume (ml). Furthermore, the Wijs reagent was prepared by dissolving 8.7 g of iodine and 7.9 g of iodine trichloride in 2 liters of glacial acetic acid.

In addition, titration was carried out using the same procedure except for not immersing the measurement sample in toluene to determine the blank titration volume (ml). The content of styrenic monomer in the polyolefin resin particles was calculated based on the equation indicated below.

$$\text{Styrenic monomer content (wt \%)} = 0.1322 \times (\text{blank titration volume} - \text{sample titration volume})/\text{weight of measurement sample (g)}$$

The aforementioned measurement was carried out every 20 minutes from the start of addition of styrenic monomer to the aqueous medium, and the largest styrenic monomer content at that time was used as the maximum styrenic monomer content.

(Mean Particle Diameter of Expandable Resin Particles)

About 50 g of expandable resin particles were sized for 5 minutes with JIS standard sieves having mesh sizes of 3.35, 2.80, 2.36, 2.00, 1.70, 1.40, 1.18, 1.00, 0.85, 0.71, 0.60, 0.50, 0.425, 0.355, 0.300, 0.250, 0.212 and 0.180 mm using a rotap sieve shaker (Iida Seisakusho Japan Corp.). The weight of sample on the sieve was measured, and the particle diameter at which the cumulative weight became 50% (median diameter) based on a cumulative weight distribution curve obtained from the results thereof was determined as the mean particle diameter.

(Blowing Agent Content of Expandable Resin Particles)

20 mg of expandable resin particles were weighed out and used as a measurement sample. This measurement sample was placed in the entrance of a thermal degradation oven (Shimadzu Corp., product name: PYR-1A) and allowed to stand in a nitrogen atmosphere over the course of 15 seconds to replace the mixed gas when the measurement sample was placed in the thermal degradation oven with nitrogen. Next, after sealing the measurement sample, the sample was placed inside the oven maintained at a temperature of 200° C., and heated over the course of 60 seconds to release the blowing agent components followed by obtaining a chart of blowing agent components under the following conditions using a gas chromatograph (Shimadzu Corp., product name: GC-14B, detector: FID). The content of blowing agent (wt %) in the expandable resin particles was then calculated from the chart based on a calibration curve of the preliminarily measured blowing agent components. The measurement conditions consisted of using a "Polapack Q" column (manufactured by GL Sciences Inc., 80/100, ϕ3 mm×1.5 m) at a column temperature of 70°, detector temperature of 110° C., inlet temperature of 110° C., using nitrogen for the carrier gas at a carrier gas flow rate of 1 ml/min. The blowing agent content (wt %) was measured with a gas chromatograph.

(Bulk Density of Pre-Expanded Particles)

Bulk density of pre-expanded particles was measured using the procedure described below.

First, pre-expanded particles were filled into a 500 cm³ graduated cylinder to the 500 cm³ graduation line.

Furthermore, filling of pre-expanded particles is considered to be completed when the graduated cylinder is viewed from a horizontal direction and even one of the pre-expanded particles has reached the 500 cm³ graduation line.

Next, the weight of the pre-expanded particles filled into the graduated cylinder is weighed to two significant figures after the decimal point, and that weight is designated as W (g). The bulk density of the pre-expanded particles was then calculated according to the equation indicated below.

$$\text{Bulk density (g/cm}^3) = W/500$$

(Molded Foam Product Fusion Rate)

A cutting line measuring 300 mm in length and 5 mm in depth was made with a cutter in the horizontal direction in the surface of a molded foam product in the shape of rectangular prism measuring 400 mm long×300 mm wide×50 mm high, and the molded foam product was divided into two halves along this cutting line. The number of foamed particles (a), which were severed internally, and the number of foamed particles (b), which separated at boundaries between particles, were respectively measured over a range of 100 to 150 arbitrary foamed particles present on the cut surfaces of the molded foam product followed by calculating the fusion rate based on the equation indicated below.

$$\text{Fusion rate(\%)} = 100 \times (a)/[(a)+(b)]$$

(Molded Foam Product Resistance to Cracking)

A test piece in the shape of a flat rectangle measuring 215 mm long, 40 mm wide and 20 mm thick was cut out of a molded foam product. The test piece was suspended between a pair of fulcrums arranged 150 mm apart in compliance with JIS K7211 followed by dropping a steel ball weighing 321 g thereon and calculating the impact value of the steel ball, namely the 50% fracture height, based on the equation indicated below.

$$50\% \text{ fracture height } H_{50} = Hi + d[\Sigma(i \times ni)/N \pm 0.5]$$

where, $H_{50}$ is the 50% fracture height (cm), Hi is the height of the test piece (cm) when the height reference (i) is 0, and the height at which the test piece is predicted to fracture, d is the height interval (cm) when the height of the test piece is raised or lowered, and the total number (N) of test pieces that fractured (or did not fracture) at each level ni (i= ... −3, −2, −1, 0, 1, 2, 3, ... ) that increased or decreased one level at a time based on a value of 0 when i equals Hi (N=Σni), whichever was greater, was used for the data. Furthermore, either number may be used when both values are equal.

±0.5 is assumed to be negative when data for the number of fractured test pieces is used, or positive when data for the number of test pieces that did not fracture is used.

Example 1

100 parts by weight of ethylene-vinyl acetate copolymer (EVA) (vinyl acetate content: 5% by weight, melting point: 105° C., melt flow rate: 0.5 g/10 minutes, density: 0.93 g/cm³), 0.5 parts by weight of diatomaceous earth (water-containing silicon dioxide) and 0.1 parts by weight of a radical scavenger in the form of n-octadecyl-3-(3,5-di-t-butyl-4-hydroxyphenyl) propionate were supplied to an extruding machine followed by melting, kneading and granulating by cutting in water to obtain oval-shaped (egg-shaped) polyolefin resin particles (micropellets). Furthermore, the melt flow rate of the ethylene-vinyl acetate copolymer is the value as determined in compliance with JIS K6924-2, while density is the value as determined in compliance with JIS K7112.

In addition, the styrene was produced by a method employing dehydration of α-phenylethyl alcohol, and the styrene was prepared so as not contain phenylacetylene.

A polymerization apparatus was prepared in which a polymerization vessel having an interval volume of 100 L was equipped with a V-type paddle stirrer (with three stirring blades). 100 parts by weight of water at 70° C., 0.8 parts by weight of magnesium pyrophosphate, 0.002 parts by weight of sodium dodecylbenzene sulfonate and 0.005 parts by weight of sodium nitrite were supplied to this polymerization vessel while stirring with the V-type paddle stirrer to obtain an aqueous medium. Subsequently, 30 parts by weight of the aforementioned polyolefin resin particles were suspended in the aqueous medium while stirring. The stirrer rotating speed was then adjusted to 150 rpm.

Next, 0.02 parts by weight of dicumyl peroxide were dissolved in 10 parts by weight of styrene and after adding to the aforementioned aqueous medium, the aqueous medium was heated to 130° C. and held at that temperature for 2 hours. Subsequently, the aqueous medium was cooled to 90° C. followed by the addition of 0.02 parts by weight of sodium dodecylbenzene sulfonate to the aqueous medium. The rotating speed of the stirrer was adjusted to 110 rpm at this time.

On the other hand, 0.20 parts by weight of an oil-soluble radical polymerization initiator in the form of benzoyl peroxide, 0.02 parts by weight of t-butylperoxy benzoate and 0.25 parts by weight of a crosslinking agent in the form of dicumyl peroxide were dissolved in a mixed monomer consisting of 19.5 parts by weight of styrene and 0.5 parts by weight of acrylic acid butyl ester to produce a first styrenic monomer. In addition, 0.07 parts by weight of a foam regulator in the form of ethylene bis-stearic acid amide were dissolved in a mixed monomer consisting of 39.0 parts by weight of styrene and 0.5 parts by weight acrylic acid butyl ester to produce a second styrenic monomer.

The first styrenic monomer was continuously dropped into the aforementioned aqueous medium at the rate of 10 parts by weight per hour, and the styrenic monomer was polymerized in the polyolefin resin particles while impregnating the styrenic monomer, polymerization initiator and crosslinking agent in the polyolefin resin particles.

Next, following completion of the addition of the first styrenic monomer into the aqueous medium, the second styrenic monomer was continuously dropped into the aqueous medium at the rate of 15 parts by weight per hour, and the styrenic monomer was polymerized in the polyolefin resin particles while impregnating the styrenic monomer and foam regulator in the polyolefin resin particles. During the course of this polymerization, the maximum content of styrenic monomer in the polyolefin resin particles was measured.

Moreover, after allowing to stand for 1 hour following completion of dropping in the second styrenic monomer to the aqueous medium while stirring the aqueous medium, the aqueous medium was heated to 140° C. and held at that temperature for 3 hours. Resin particles were subsequently obtained by cooling the polymerization vessel.

Continuing, 100 parts by weight of resin particles, 1.0 parts by weight of water, 0.15 parts by weight of stearic acid monoglyceride and 1.0 parts by weight of diisobutyl adipate were supplied to a pressure-resistant rotating mixer having an internal volume of 50 L followed by injecting 14 parts by weight of pentane (mixture of 60% by weight normal-pentane and 40% by weight iso-pentane) at normal temperature while rotating. The temperature inside the rotating mixer was then raised to 70° C. and held at that temperature for 4 hours followed by cooling to 20° C. and then removing expandable resin particles having a mean particle diameter of 1500 μm. The thickness of the surface layer of the expandable resin particles and the pentane content were measured at this time.

The removed expandable resin particles were stored for 30 days in a refrigerator at 5° C. followed by sampling a portion thereof and measuring the pentane content. In addition, the expandable resin particles were supplied to a pre-expanding machine (Sekisui Machinery Co., Ltd., product name: "SKK-70") followed by pre-expanding using water vapor at a pressure of 0.02 MPa to obtain pre-expanded particles having a bulk density of 0.025 g/cm$^3$.

Next, after allowing the pre-expanded particles to stand for 7 days at room temperature, the pre-expanded particles were filled into the mold of a molding machine (Sekisui Machinery Co., Ltd., product name: "ACE-3SP"). Water vapor was supplied to the mold to induce secondary foaming of the pre-expanded particles and produce a molded foam product in the shape of a rectangular prism measuring 400 mm long×300 mm wide×50 mm high and having a density of 0.025 g/cm$^3$. The fusion rate and resistance to cracking of the molded foam product were measured.

Example 2

Expandable resin particles and a molded foam product were obtained in the same manner as Example 1 with the exception of using styrene produced by dehydrogenating ethylbenzene (containing 55 ppm phenylacetylene) for the styrene.

Example 3

Expandable resin particles and a molded foam product were obtained in the same manner as Example 1 with the exception of using styrene produced by dehydrogenating ethylbenzene (containing 120 ppm phenylacetylene) for the styrene.

Comparative Example 1

Expandable resin particles and a molded foam product were obtained in the same manner as Example 1 with the exception of using styrene produced by dehydrogenating ethylbenzene (containing 170 ppm phenylacetylene) for the styrene.

Comparative Example 2

Expandable resin particles and a molded foam product were obtained in the same manner as Example 1 with the exception of not using a radical scavenger in the form of n-octadecyl-3-(3,5-di-t-butyl-4-hydroxyphenyl) propionate in the obtaining of polyolefin resin particles (micropellets) by supplying ethylene-vinyl acetate copolymer (EVA) to an extruding machine followed by melting, kneading and granulation by cutting in water.

Comparative Example 3

Expandable resin particles and a molded foam product were obtained in the same manner as Example 1 with the exception of using 0.6 parts by weight of a radical scavenger in the form of n-octadecyl-3-(3,5-di-t-butyl-4-hydroxyphenyl) propionate in the obtaining of polyolefin resin particles (micropellets) by supplying ethylene-vinyl acetate copolymer (EVA) to an extruding machine followed by melting, kneading and granulation by cutting in water. However, a large amount of styrenic monomer remained in the expandable resin particles, and a molded foam product thereof exhibited considerable shrinkage, thereby preventing the obtaining of a favorable appearance.

Example 4

Expandable resin particles and a molded foam product were obtained in the same manner as Example 1 with the exception of using 20 parts by weight of polyolefin resin particles suspended in aqueous medium, producing the first styrenic monomer by dissolving 0.25 parts by weight of a polymerization initiator in the form of benzoyl peroxide, 0.02 parts by weight of t-butylperoxy benzoate and 0.25 parts by weight of a crosslinking agent in the form of dicumyl peroxide in a mixed monomer consisting of 19.5 parts by weight of styrene and 0.5 parts by weight of acrylic acid butyl ester, and producing the second styrenic monomer by dissolving 0.07 parts by weight of a foam regulator in the form of ethylene bis-stearic acid amide in a mixed monomer consisting of 49.5 parts by weight of styrene and 0.5 parts by weight of acrylic acid butyl ester.

Example 5

Expandable resin particles and a molded foam product were obtained in the same manner as Example 1 with the exception of using 35 parts by weight of polyolefin resin particles suspended in aqueous medium, producing the first styrenic monomer by dissolving 0.20 parts by weight of a polymerization initiator in the form of benzoyl peroxide, 0.02 parts by weight of t-butylperoxy benzoate and 0.25 parts by weight of a crosslinking agent in the form of dicumyl peroxide in a mixed monomer consisting of 19.5 parts by weight of styrene and 0.5 parts by weight of acrylic acid butyl ester, and producing the second styrenic monomer by dissolving 0.07 parts by weight of a foam regulator in the form of ethylene bis-stearic acid amide in a mixed monomer consisting of 34.5 parts by weight of styrene and 0.5 parts by weight of acrylic acid butyl ester.

Comparative Example 4

Expandable resin particles and a molded foam product were obtained in the same manner as Example 1 with the exception of using 10 parts by weight of polyolefin resin particles suspended in aqueous medium, producing the first styrenic monomer by dissolving 0.35 parts by weight of a polymerization initiator in the form of benzoyl peroxide, 0.02 parts by weight of t-butylperoxy benzoate and 0.20 parts by weight of a crosslinking agent in the form of dicumyl peroxide in a mixed monomer consisting of 34.5 parts by weight of styrene and 0.5 parts by weight of acrylic acid butyl ester, dropping in the first styrenic monomer into the aqueous medium at the rate of 10 parts by weight per hour, producing the second styrenic monomer by dissolving 0.07 parts by weight of a foam regulator in the form of ethylene bis-stearic acid amide in a mixed monomer consisting of 44.5 parts by weight of styrene and 0.5 parts by weight of acrylic acid butyl ester, and dropping in the second styrenic monomer into the aqueous medium at the rate of 10 parts by weight per hour.

Comparative Example 5

Expandable resin particles and a molded foam product were obtained in the same manner as Example 1 with the exception of using 45 parts by weight of polyolefin resin particles suspended in aqueous medium, producing the first styrenic monomer by dissolving 0.15 parts by weight of a polymerization initiator in the form of benzoyl peroxide, 0.02 parts by weight of t-butylperoxy benzoate and 0.20 parts by weight of a crosslinking agent in the form of dicumyl peroxide in 15 parts by weight of styrene, dropping in the first styrenic monomer into the aqueous medium at the rate of 10 parts by weight per hour, producing the second styrenic monomer by dissolving 0.07 parts by weight of a foam regulator in the form of ethylene bis-stearic acid amide in 30 parts by weight of styrene, and dropping in the second styrenic monomer into the aqueous medium at the rate of 15 parts by weight per hour. However, when the expandable resin particles were stored for 30 days in a refrigerator at 5° C., the pentane content thereof decreased considerably, and the target pre-expanded particles having a bulk density of 0.025 g/cm$^3$ and molded foam product having a density of 0.025 g/cm$^3$ were unable to be obtained.

Comparative Example 6

Polyolefin resin particles (micropellets) were obtained without using a radical scavenger in the supplying of ethylene-vinyl acetate copolymer (EVA) to an extruding machine followed by mixing, kneading and granulating by cutting in water. In addition, styrene produced by dehydrogenating ethylbenzene (containing 170 ppm of phenylacetylene) was used for the styrene.

Expandable resin particles and a molded foam product were obtained in the same manner as Example 1 with the exception of using 40 parts by weight of polyolefin resin particles suspended in aqueous medium, producing the first styrenic monomer of Example 1 by dissolving 0.15 parts by weight of a polymerization initiator in the form of benzoyl peroxide, 0.02 parts by weight of t-butylperoxy benzoate and 0.25 parts by weight of a crosslinking agent in the form of dicumyl peroxide in a mixed monomer consisting of 14.5 parts by weight of styrene and 0.5 parts by weight of acrylic acid butyl ester, dropping in the first styrenic monomer into the aqueous medium at the rate of 10 parts by weight per hour, producing the second styrenic monomer by dissolving 0.07 parts by weight of a foam regulator in the form of ethylene bis-stearic acid amide in a mixed monomer consisting of 34.5 parts by weight of styrene and 0.5 parts by weight of acrylic acid butyl ester, and dropping in the second styrenic monomer into the aqueous medium at the rate of 15 parts by weight per hour.

Comparative Example 7

Polyolefin resin particles (micropellets) were obtained without using a radical scavenger in the supplying of ethylene-vinyl acetate copolymer (EVA) to an extruding machine followed by mixing, kneading and granulating by cutting in water in the same manner as Comparative Example 6. In addition, styrene produced by dehydrogenating ethylbenzene (containing 170 ppm of phenylacetylene) was used for the styrene.

The polymerization apparatus was the same as that used in Example 1. 100 parts by weight of water at 70° C., 0.8 parts by weight of magnesium pyrophosphate, 0.002 parts by weight of sodium dodecylbenzene sulfonate and 0.005 parts by weight of sodium nitrite were supplied to this polymerization vessel while stirring with the V-type paddle stirrer to obtain an aqueous medium. Subsequently, 30 parts by weight of the aforementioned polyolefin resin particles were suspended in the aqueous medium while stirring. The stirrer rotating speed was then adjusted to 150 rpm.

Next, 0.02 parts by weight of dicumyl peroxide were dissolved in 10 parts by weight of styrene and after adding to the aforementioned aqueous medium, the aqueous medium was heated to 130° C. and held at that temperature for 2 hours. Subsequently, the aqueous medium was cooled to 70° C. followed by the addition of 0.02 parts by weight of sodium dodecylbenzene sulfonate to the aqueous medium. The rotating speed of the stirrer was adjusted to 110 rpm at this time.

On the other hand, 0.15 parts by weight of an oil-soluble radical polymerization initiator in the form of benzoyl peroxide, 0.02 parts by weight of t-butylperoxy benzoate, 0.25 parts by weight of a crosslinking agent in the form of dicumyl peroxide and 0.07 parts by weight of a foam regulator in the form of acrylic acid butyl ester were dissolved in a mixed monomer consisting of 59.0 parts by weight of styrene and 1.0 parts by weight of acrylic acid butyl ester to produce a first styrenic monomer. The polyolefin resin particles were impregnated with styrenic monomer by adding to the aqueous medium at 70° C. at the rate of 25 parts by weight per hour.

Subsequently, the aqueous medium was heated to 90° C. and held at that temperature for 5 hours to polymerize the styrenic monomer in the polyolefin resin particles. Moreover, after heading the aqueous medium to 140° C. and holding at that temperature for 3 hours, the polymerization vessel was cooled to obtain resin particles. Expandable resin particles, pre-expanded particles and molded foam product were obtained in the same manner as Example 1.

Example 6

100 parts by weight of linear low-density polyethylene (LLDPE) (melting point: 116° C., melt flow rate: 2.0 g/10 minutes, density: 0.913 g/cm$^3$), 0.3 parts by weight of talc and 0.05 parts by weight of a radical scavenger in the form of pentaerythrityl-tetraquis[3-(3,5-di-t-butyl-4-hydroxyphenyl)propionate] were supplied to an extruding machine followed by melting, kneading and granulating by cutting in water to obtain oval-shaped (egg-shaped) polyolefin resin particles. Furthermore, the melt flow rate and density of the linear low-density polyethylene were measured in compliance with JIS K6922-1.

Using the same polymerization apparatus as Example 1, 100 parts by weight of water at 70° C., 0.8 parts by weight of magnesium pyrophosphate, 0.02 parts by weight of sodium dodecylbenzene sulfonate and 0.01 parts by weight of sodium nitrite were supplied to the polymerization vessel of this polymerization apparatus while stirring with a V-type paddle stirrer to obtain an aqueous medium. Subsequently, 25 parts by weight of the aforementioned polyolefin resin particles were suspended in the aqueous medium while stirring. The stirrer rotating speed was adjusted to 115 rpm after having heated the aqueous medium to 120° C.

On the other hand, styrenic monomer was produced by dissolving 0.35 parts by weight of a polymerization initiator in the form of dicumyl peroxide in 75 parts by weight of the styrene used in Example 1.

The styrenic monomer was continuously dropped into the aforementioned aqueous medium at the rate of 10 parts by weight per hour, and the styrenic monomer was polymerized in the polyolefin resin particles while impregnating the styrenic monomer and polymerization initiator in the polyolefin resin particles.

Moreover, after allowing to stand for 1 hour following completion of dropping in the styrenic monomer to the aqueous medium while stirring the aqueous medium, the aqueous medium was heated to 140° C. and held at that temperature for 1 hour. Resin particles were subsequently removed after cooling the polymerization vessel.

Continuing, an impregnation apparatus was prepared in which a polymerization vessel having an interval volume of 100 L was equipped with a V-type paddle stirrer (with three stirring blades). 100 parts by weight of water and 0.01 parts by weight of sodium dodecylbenzene sulfonate were supplied to this impregnation vessel while stirring with the V-type paddle stirrer to obtain an aqueous medium. Subsequently, 100 parts by weight of the aforementioned resin particles, 0.15 parts by weight of stearic acid monoglyceride and 1.5 parts by weight of diisobutyl adipate were supplied to the aqueous medium and suspended therein while stirring. The stirrer rotating speed was then adjusted to 100 rpm. Next, after heating the aqueous medium to 70° C., 12 parts by weight of pentane (mixture of 60% by weight normal-pentane and 40% by weight iso-pentane) were injected. After holding the temperature at 70° C. for 3 hours after the injection of pentane, the aqueous medium was cooled to 15° C. followed by removing expandable resin particles having a mean particle diameter of 1300 μm. The thickness of the surface layer of the expandable resin particles and the pentane content were measured at this time.

The removed expandable resin particles were stored for 30 days in a refrigerator at 5° C. followed by sampling a portion thereof and measuring the pentane content. In addition, the expandable resin particles were supplied to a pre-expanding machine (Sekisui Machinery Co., Ltd., product name: "SKK-70") followed by pre-expanding using water vapor at a pressure of 0.025 MPa to obtain pre-expanded particles having a bulk density of 0.033 g/cm$^3$.

Next, after allowing the pre-expanded particles to stand for 7 days at room temperature, the pre-expanded particles were filled into the mold of a molding machine (Sekisui Machinery Co., Ltd., product name: "ACE-3SP"). Water vapor was supplied to the mold to induce secondary foaming of the pre-expanded particles and produce a molded foam product in the shape of a rectangular prism measuring 400 mm long×300 mm wide×50 mm high and having a density of 0.033 g/cm$^3$. The fusion rate and resistance to cracking of the molded foam product were measured.

Comparative Example 8

Polyolefin resin particles (micropellets) were obtained without using a radical scavenger in the supplying of linear low-density polyethylene (LLDPE) to an extruding machine followed by melting, kneading and granulating by cutting in water. In addition, styrene produced by dehydrogenating ethylbenzene (containing 170 ppm of phenylacetylene) was used for the styrene.

Moreover, expandable resin particles and a molded foam product were obtained in the same manner as Example 6 with the exception of using 40 parts by weight of polyolefin resin particles suspended in aqueous medium, producing styrenic monomer by dissolving 0.30 parts by weight of a polymerization initiator in the form of dicumyl peroxide in 60 parts by weight of the aforementioned styrene, and dropping this into the aqueous medium at the rate of 10 parts by weight per hour.

The maximum content of styrenic monomer in the polyolefin resin particles part way through impregnation and polymerization of styrenic monomer, the thickness of the surface layer of the expandable resin particles, the pentane content, and fusion rate of the molded foam products and the resistance to cracking of the molded foam products in Examples to 6 and Comparative Example 1 to 8 are shown in Tables 1 to 3. Furthermore, pentane retention rate was calculated according to the equation shown below.

Pentane retention rate(%)=Pentane content (wt %) after 30 days/pentane content (wt %) immediately after removal×100

TABLE 1

| | Ex. 1 | Ex. 2 | Ex. 3 | Comp. Ex. 1 | Comp. Ex. 2 | Comp. Ex. 3 |
|---|---|---|---|---|---|---|
| (Extrusion/granulation step) | | | | | | |
| Type and amt. used of polyolefin resin (parts by weight) | EVA resin 100 | EVA resin 100 | EVA resin 100 | EVA resin 100 | EVA resin 100 | EVA resin 100 |
| Type and amt. used of radical scavenger (parts by weight) | Anti-oxidant*1 0.1 | Anti-oxidant*1 0.1 | Anti-oxidant*1 0.1 | Anti-oxidant*1 0.1 | Not added 0 | Anti-oxidant*1 0.6 |
| (Polymerization step) | | | | | | |
| Amt. of polyolefin resin particles used (parts by weight) | 30 | 30 | 30 | 30 | 30 | 30 |
| Composition and amt. used of styrenic monomer (parts by weight) | St 69 BA 1 | St 69 BA 1 | St 69 BA 1 | St 69 BA 1 | St 69 BA 1 | St 69 BA 1 |
| Phenylacetylene content in styrene (ppm) | 0 | 55 | 120 | 170 | 0 | 0 |

TABLE 1-continued

|  | Ex. 1 | Ex. 2 | Ex. 3 | Comp. Ex. 1 | Comp. Ex. 2 | Comp. Ex. 3 |
|---|---|---|---|---|---|---|
| Amt. of styrenic monomer used to 100 parts by weight of polyolefin resin particles (parts by weight) | 233 | 233 | 233 | 233 | 233 | 233 |
| Max. content of styrenic monomer (wt %) | 21.5 | 23.8 | 24.4 | 28.6 | 19.6 | 39.3 |
| (Evaluation of expandable modified resin particles) | | | | | | |
| Surface layer thickness (μm) | 32.2 | 31.4 | 24.8 | 11.4 | 7.0 | 61.8 |
| Pentane content (wt %) immediately after removal | 8.9 | 8.6 | 8.6 | 8.7 | 8.5 | 8.2 |
| Pentane content (wt %) after 30 days | 7.8 | 7.5 | 7.3 | 7.0 | 6.9 | 5.3 |
| Pentane retention rate (%) | 88 | 87 | 85 | 80 | 81 | 65 |
| (Evaluation of molded foam products) | | | | | | |
| Fusion rate (%) | 95 | 95 | 90 | 80 | 80 | Molded foam product not obtained due to shrinkage |
| Resistance to cracking (cm) | 39.5 | 38.5 | 36.5 | 28.5 | 26.5 | |

[1]Antioxidant: n-Octadecyl-3-(3,5-di-t-butyl-4-hydroxyphenyl) propionate

TABLE 2

|  | Ex. 4 | Ex. 5 | Comp. Ex. 4 | Comp. Ex. 5 | Comp. Ex. 6 | Comp. Ex. 7 |
|---|---|---|---|---|---|---|
| (Extrusion/granulation step) | | | | | | |
| Type and amt. used of polyolefin resin (parts by weight) | EVA resin 100 | EVA resin 100 | EVA resin 100 | EVA resin 100 | EVA resin 100 | EVA resin 100 |
| Type and amt. used of radical scavenger (parts by weight) | Antioxidant[1] 0.1 | Antioxidant[1] 0.1 | Antioxidant[1] 0.1 | Antioxidant[1] 0.1 | Not added 0 | Not added 0 |
| (Polymerization step) | | | | | | |
| Amt. of polyolefin resin particles used (parts by weight) | 20 | 35 | 10 | 45 | 40 | 30 |
| Composition and amt. used of styrenic monomer (parts by weight) | St 79 BA 1 | St 64 BA 1 | St 89 BA 1 | St 55 — | St 59 BA 1 | St 69 BA 1 |
| Phenylacetylene content in styrene (ppm) | 0 | 0 | 0 | 0 | 170 | 170 |

TABLE 2-continued

|  | Ex. 4 | Ex. 5 | Comp. Ex. 4 | Comp. Ex. 5 | Comp. Ex. 6 | Comp. Ex. 7 |
|---|---|---|---|---|---|---|
| Amt. of styrenic monomer used to 100 parts by weight of polyolefin resin particles (parts by weight) | 400 | 186 | 900 | 122 | 150 | 233 |
| Max. content of styrenic monomer (wt %) (Evaluation of expandable modified resin particles) | 28.6 | 19.0 | 30.5 | 15.8 | 28.2 | 45.7 |
| Surface layer thickness (μm) | 23.6 | 65.4 | 12.2 | 167.6 | 9.4 | Unclear |
| Pentane content (wt %) immediately after removal | 9.1 | 8.4 | 9.5 | 7.7 | 8.1 | 8.5 |
| Pentane content (wt %) after 30 days | 8.4 | 7.0 | 9.1 | 4.7 | 5.8 | 6.4 |
| Pentane retention rate (%) (Evaluation of molded foam products) | 92 | 83 | 96 | 61 | 72 | 75 |
| Fusion rate (%) | 95 | 95 | 95 | Molded foam product not obtained | 70 | 50 |
| Resistance to cracking (cm) | 26.5 | 43.5 | 15.5 |  | 38.5 | 16.5 |

*[1] Antioxidant: n-Octadecyl-3-(3,5-di-t-butyl-4-hydroxyphenyl) propionate

TABLE 3

|  | Example 6 | Comparative Example 8 |
|---|---|---|
| (Extrusion/granulation step) |  |  |
| Type and amt. used of polyolefin resin (parts by weight) | LLDPE resin 100 | LLDPE resin 100 |
| Type and amt. used of radical scavenger (parts by weight) | Antioxidant*[2] 0.05 | Not added 0 |
| (Polymerization step) |  |  |
| Amt. of polyolefin resin particles used (parts by weight) | 25 | 40 |
| Composition and amt. used of styrenic monomer (parts by weight) | St 75 | St 60 |
| Phenylacetylene content in styrene (ppm) | 0 | 170 |
| Amt. of styrenic monomer used to 100 parts by weight of polyolefin resin particles (parts by weight) | 300 | 150 |
| Max. content of styrenic monomer (wt %) (Evaluation of expandable modified resin particles) | 14.7 | 29.1 |
| Surface layer thickness (μm) | 27.8 | 10.6 |
| Pentane content (wt %) immediately after removal | 8.9 | 8.6 |
| Pentane content (wt %) after 30 days | 8.3 | 5.0 |
| Pentane retention rate (%) (Evaluation of molded foam products) | 93 | 58 |
| Fusion rate (%) | 90 | 60 |
| Resistance to cracking (cm) | 70.5 | 59.5 |

*[2] Antioxidant: Pentaerythrityl-tetraquis[3-(3,5-di-t-butyl-4-hydroxyphenyl)propionate]

As can be understood from the results shown in Tables 1 to 3, the expandable resin particles of the present invention have favorable blowing agent retention and superior bead life. In addition, as shown in Tables 1 to 3, these expandable resin particles allow the providing of molded foam products having superior resistance to cracking.

For example, despite the expandable resin particles of Examples 1 to 3 (polyolefin resin/polystyrenic resin=30/70) having a lower incorporated amount of polyolefin resin than the expandable resin particles of Comparative Example 6 (polyolefin resin/polystyrenic resin=40/60), they have equally superior performance in terms of resistance to cracking as well as considerably improved bead life. In addition, the same is true in a comparison between Example 6 and Comparative Example 8 using linear low-density polyethylene for the polyolefin resin.

According to the present invention, molded foam products having superior resistance to cracking and fusion rate as well as expandable polystyrenic resin particles serving as raw material beads thereof can be provided. These resin particles have superior retention of blowing agent and can be stored for a long period of time. Thus, since only the required amount of resin particles can be pre-expanded and molded when necessary, production efficiency is favorable and molded foam products can be produced comparatively inexpensively.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. Expandable polystyrenic resin particles comprising a volatile blowing agent in polystyrenic resin particles obtained by forming a polystyrenic resin in polyolefin resin particles by impregnating and polymerizing a styrenic monomer; wherein, 140 to 600 parts by weight of the styrenic monomer are impregnated and polymerized to 100 parts by weight of the polyolefin resin particles, wherein an average thickness of the surface layer of the particles observed in scanning electron micrographs obtained by immersing sections cut into halves through the center from the surface of the resin particles in tetrahydrofuran followed by extracting the polystyrenic resin component and capturing cross-sections of said sections is 15 to 150 μm, and the volatile blowing agent is contained at 5.5 to 13.0% by weight of the expandable polystyrenic resin particles.

2. Expandable polystyrenic resin particles according to claim 1, wherein the average thickness of the surface layer is 20 to 100 μm.

3. Expandable particles having a bulk density of 0.015 to 0.25 g/cm$^3$ obtained by forming the expandable polystyrenic resin particles according to claim 1 or 2.

4. A molded foam product obtained by molding the expandable particles according to claim 3 in a mold.

5. Expandable polystyrenic resin particles according to claim 1 or 2, wherein the polyolefin resin contained in the polystyrenic resin particles is branched low-density polyethylene, linear low-density polyethylene or ethylene-vinyl acetate copolymer, and the polystyrenic resin is a polystyrene, a styrene-alkyl acrylate copolymer or styrene-alkyl methacrylate copolymer.

6. Expandable polystyrenic resin particles according to claim 1 or 2, wherein the volatile blowing agent is pentane.

7. Expandable polystyrenic resin particles according to claim 1 or 2, wherein the mean particle diameter is 800 to 2400 μm.

8. A process for producing expandable polystyrenic resin particles comprising the steps of: 1) melt-extruding a polyolefin resin followed by granulating to obtain polyolefin resin particles, and 2) dispersing the polyolefin resin particles in an aqueous medium, impregnating the polyolefin resin particles with a styrenic monomer while polymerizing in the presence of an oil-soluble radical polymerization initiator, and impregnating with a volatile blowing agent either during or following completion of polymerization; wherein, the melt-extrusion of the polyolefin resin of step 1) is carried out in the presence of 0.005 to 0.5 parts by weight of a radical scavenger to 100 parts by weight of polyolefin resin, and the polymerization of step 2) uses 140 to 600 parts by weight of styrenic monomer, in which the content of phenylacetylene is 150 ppm or less, to 100 parts by weight of polyolefin resin particles.

9. The process for producing expandable polystyrenic resin particles according to claim 8, wherein the polyolefin resin is branched low-density polyethylene, linear low-density polyethylene or ethylene-vinyl acetate copolymer, and the styrenic monomer is a styrene, a comonomer of styrene and an alkyl acrylate having styrene has a main component thereof, or a comonomer of styrene and an alkyl methacrylate having styrene has a main component thereof.

10. The process for producing expandable polystyrenic resin particles according to claim 9, wherein the styrene is obtained by dehydrating α-phenylethyl alcohol.

11. The process for producing expandable polystyrenic resin particles according to any of claims 8 to 10, wherein a water-soluble radical polymerization inhibitor is used at 0.001 to 0.04 parts by weight to 100 parts by weight of water of the aqueous medium.

12. The process for producing expandable polystyrenic resin particles according to claim 11, wherein the water-soluble radical polymerization inhibitor is a nitrite.

13. The process for producing expandable polystyrenic resin particles according to any of claims 8 to 10, wherein the radical scavenger is a phenol-based antioxidant.

14. The process for producing expandable polystyrenic resin particles according to any of claims 8 to 10, wherein impregnation and polymerization of styrenic monomer are carried out under conditions such that the content of styrenic monomer in the polyolefin resin particles is 35% by weight or less.

15. A process for producing pre-expanded particles comprising the steps of: 1) melt-extruding a polyolefin resin followed by granulation to obtain polyolefin resin particles, wherein melt-extrusion of the polyolefin resin is carried out in the presence of 0.005 to 0.5 parts by weight of a radical scavenger to 100 parts by weight of polyolefin resin; 2) dispersing the polyolefin resin particles in an aqueous medium, impregnating the polyolefin resin particles with styrenic monomer while polymerizing in the presence of an oil-soluble radical polymerization initiator, and impregnating a volatile blowing agent either during or following completion of polymerization to obtain expandable polystyrenic resin particles, wherein the polymerization uses 140 to 600 parts by weight of styrenic monomer having a phenylacetylene content of 150 ppm or less to 100 parts by weight of polyolefin resin particles; and 3) pre-expanding the resulting expandable polystyrenic resin particles.

16. A process for producing a molded foam product comprising the steps of: 1) melt-extruding a polyolefin resin followed by granulation to obtain polyolefin resin particles, wherein melt-extrusion of the polyolefin resin is carried out in the presence of 0.005 to 0.5 parts by weight of a radical scavenger to 100 parts by weight of polyolefin resin; 2) dispersing the polyolefin resin particles in an aqueous medium, impregnating the polyolefin resin particles with styrenic monomer while polymerizing in the presence of an oil-soluble radical polymerization initiator, and impregnating a volatile blowing agent either during or following completion of polymerization to obtain expandable polystyrenic resin particles, wherein the polymerization uses 140 to 600 parts by weight of styrenic monomer having a phenylacetylene content of 150 ppm or less to 100 parts by weight of polyolefin resin particles; 3) pre-expanding the resulting expandable polystyrenic resin particles to obtain pre-expanded particles; and 4) molding the resulting pre-expanded particles in a mold.

* * * * *